(12) United States Patent
Lee

(10) Patent No.: US 12,320,322 B1
(45) Date of Patent: Jun. 3, 2025

(54) UTILITY-SCALE WAVE ENERGY CONVERTERS

(71) Applicant: Li Lee, Las Vegas, NV (US)

(72) Inventor: Li Lee, Las Vegas, NV (US)

( * ) Notice: Subject to any disclaimer, the term of this patent is extended or adjusted under 35 U.S.C. 154(b) by 0 days.

(21) Appl. No.: 18/608,060

(22) Filed: Mar. 18, 2024

(51) Int. Cl.
*F03B 13/18* (2006.01)

(52) U.S. Cl.
CPC .... *F03B 13/1845* (2013.01); *F05B 2220/707* (2013.01); *F05B 2240/95* (2013.01)

(58) Field of Classification Search
CPC ........... F03B 13/1845; F05B 2220/707; F05B 2240/95
See application file for complete search history.

(56) References Cited

U.S. PATENT DOCUMENTS

| | | | |
|---|---|---|---|
| 7,323,790 B2 | 1/2008 | Taylor et al. | |
| 7,877,994 B2 | 2/2011 | Bull et al. | |
| 10,767,618 B2 | 9/2020 | Lehmann et al. | |
| 11,002,243 B2 | 5/2021 | Lehmann et al. | |
| 11,199,173 B2 | 12/2021 | Mattiazzo et al. | |
| 2012/0285544 A1* | 11/2012 | Westby | F03B 13/1845 137/1 |
| 2018/0306164 A1* | 10/2018 | Lehmann | F03B 13/187 |
| 2019/0211797 A1* | 7/2019 | Viselli | F03B 13/16 |
| 2021/0285415 A1* | 9/2021 | Vamvas | B63B 35/44 |
| 2023/0323850 A1* | 10/2023 | Sidenmark | B63B 35/44 290/53 |
| 2023/0358205 A1* | 11/2023 | Bernitsas | F03B 17/06 |

FOREIGN PATENT DOCUMENTS

| | | | | |
|---|---|---|---|---|
| GB | 2491802 A | * | 12/2012 | .......... F03B 13/1815 |
| NO | 346423 B1 | * | 8/2022 | |
| WO | WO-2014086417 A1 | * | 6/2014 | ........... B63B 22/021 |
| WO | WO-2022260521 A1 | * | 12/2022 | ............. F03B 13/18 |

\* cited by examiner

*Primary Examiner* — Viet P Nguyen

(57) ABSTRACT

The present invention discloses methods and apparatus for converting water wave energy into electricity on a utility scale. The device comprises: (1) an oscillating body that effectively responds to waves in all six degrees of freedom: surge, sway, heave, roll, pitch, and yaw, (2) a restraining system to prevent the oscillating body from being displaced by steady environmental loads, and (3) a power takeoff system comprising linear generators which are directly driven by the oscillating body to generate electricity. The devised devices excel in harnessing wave energy across a wide spectrum of frequencies and are well-suited for deployment in both shallow and deep ocean waters.

20 Claims, 7 Drawing Sheets

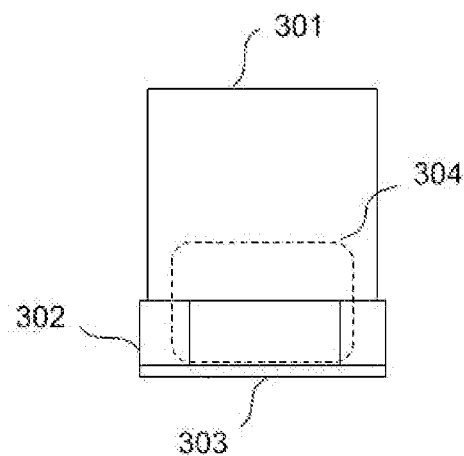
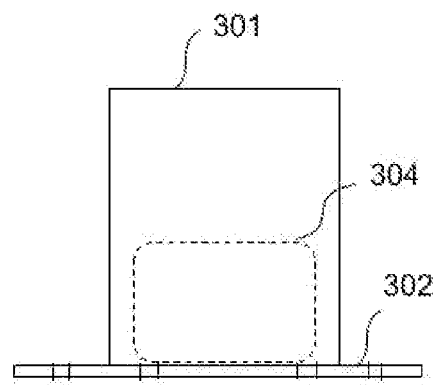
FIG. 3A                FIG. 3B
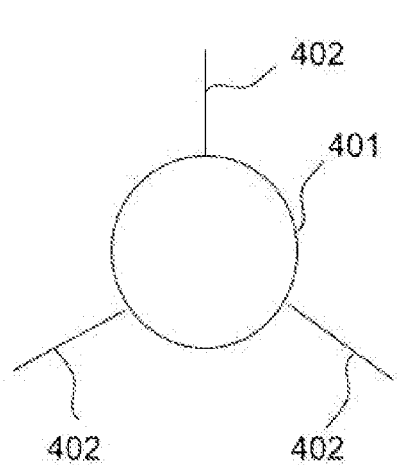
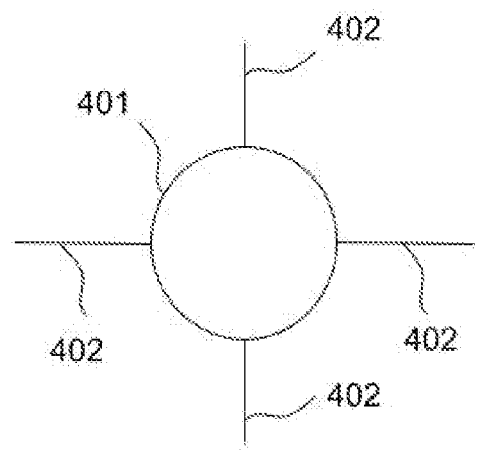
FIG. 4A                FIG. 4B

UTILITY-SCALE WAVE ENERGY CONVERTERS

FIELD OF THE INVENTION

The present invention discloses methods and apparatus for converting water wave energy into electricity on a utility scale, employing a wave-activated oscillating body and linear generators.

BACKGROUND

Water covers approximately 71% of the Earth's surface, comprising oceans, rivers, and lakes. Waves are generated by wind blowing across the water surface, carrying a significant amount of energy. This wave energy consists of both potential energy (related to position) and kinetic energy (related to motion), both of which can be extracted through various mechanical means to generate electricity. The devices designed to extract wave energy and convert it into electricity are commonly referred to as wave energy converters (WEC).

While various types of WEC have been discussed in the literature, few have achieved utility-scale power generation, defined by the US Energy Information Administration for renewable energy as a generation rate of 1 MW (Megawatt) or greater. Among these WEC, wave-activated oscillating body devices stand out as particularly promising. A prime illustration is the point absorber, which harnesses energy from the relative linear motion between a wave-activated body and a stationary structure, converting vertical mechanical movement into electricity. Another noteworthy example is the oscillating surge WEC, designed to exploit the surging motion of progressive waves and extract energy in the horizontal surge direction. Nonetheless, single degree-of-freedom (DOF) devices might only capture a portion of wave energy, and their efficacy declines when wave frequency diverges from the natural frequency.

The ocean environment presents challenges, particularly during extreme weather conditions, where high winds and large waves pose risks to mechanical devices. To withstand such conditions, it is necessary for WEC to be robust and capable of disconnecting or mitigating potential damages during harsh weather. Additionally, corrosion resistance in seawater is crucial.

The average power flow intensity just below the ocean surface typically ranges from 2 to 3 $kW/m^2$ (kilowatts per square meter) perpendicular to the wave direction. Achieving utility-scale power generation, such as 1 MW, requires large oscillating bodies, necessitating stringent design requirements and high fabrication, installation, and operational costs.

Over the past fifty years, cost-effective floating platforms (floaters) have been developed for various ocean applications, such as tension leg platforms (TLP), semi-submersible platforms, spar platforms, and data buoys. The hulls of these floaters, meticulously engineered to operate reliably even in challenging environmental conditions, possess the potential to function as oscillating bodies for WEC with suitable modifications. Lessons can also be drawn from damper systems utilized in substantial structures such as high-rise buildings to alleviate vibrations caused by winds or seismic events.

A fundamental design principle for WEC is aligning the natural frequency with the wave frequency to achieve resonance and maximize energy extraction. The wave frequency typically falls within the range of 0.03 to 0.3 Hz (hertz), with more frequent waves occurring between 0.125 and 0.25 Hz. Covering the broad range of wave frequencies effectively requires innovative methods, such as mounting multiple mechanical resonators on the oscillating body or adjusting stiffness or mass to align natural frequency with wave frequency. In deep waters, installing permanent structures becomes more challenging due to harsh environmental conditions. Power takeoff (PTO) from oscillating bodies in deep waters presents difficulties, although technologies like linear generators and tension application to slender structures offer potential solutions.

Considering the challenges and opportunities outlined, the advancement of utility-scale WEC capable of efficiently, reliably, and economically harnessing wave energy in the ocean is imperative. The current invention seeks to tackle several of these goals.

BRIEF DESCRIPTION OF THE DRAWINGS

FIGS. 3A and 3B illustrate the closed and open positions, respectively, of the folding plate of an oscillating body with ballast weights.

FIGS. 4A and 4B display two restraining systems for an oscillating body.

DETAILED DESCRIPTION OF THE INVENTION

The present WEC invention comprises three primary components: (1) an oscillating body that floats on the water surface, responding to waves to extract wave energy, (2) a restraining system for the oscillating body, situated either within or outside of the water, designed to prevent displacement by steady external forces like winds or currents, and (3) a power-takeoff (PTO) system comprising expandable and retractable linear generators, which can also be positioned either within or outside of the water, tasked with converting mechanical energy into electricity.

Figure 1:
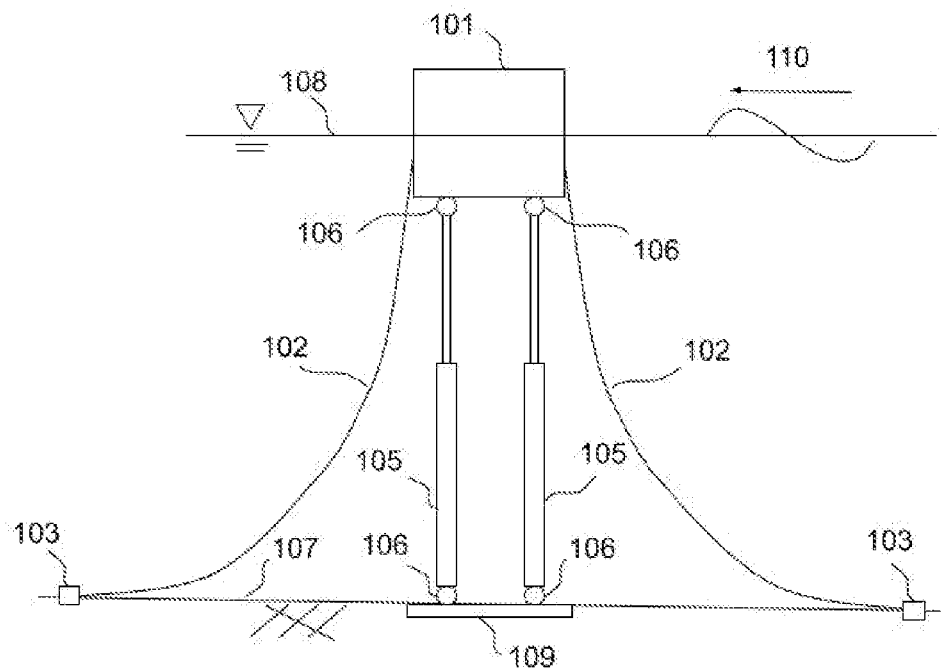
FIG. 1 illustrates an embodiment of the present invention, depicting its working principle and primary components.

FIG. 1 illustrates an embodiment of the invention. An oscillating body 101 floats on the water surface 108 and is activated by waves 110, thereby extracting wave energy. A restraining system comprises mooring lines 102 secured to the seabed 107 by anchors 103, preventing the oscillating body 101 from being displaced by winds, currents, or other steady external forces. A PTO system comprises expandable and retractable linear generators 105 connected via universal joints 106 to the oscillating body 101 at one end and to a seabed template 109 via universal joints 106 at the other end, converting mechanical energy into electricity.

The first primary component of the present invention is the oscillating body, which remains buoyant on the water surface. It possesses a draft and can be constructed into various shapes using a range of metallic and nonmetallic structural materials. The movement of the oscillating body is defined by six DOF: three translational (surge, sway, and heave) and three rotational (roll, pitch, and yaw). When waves interact with the oscillating body, the ensuing oscillatory wave forces induce motion across all six DOF.

One critical requirement of the oscillating body is that it must not capsize (roll over) when disturbed. The oscillating body's design ensures stability against capsizing, requiring a positive metacentric height (GM) for hydrostatic stability, i.e., its center of gravity is below its metacenter.

The WEC is dimensioned to attain the desired natural frequency, which is determined by the combined factors of mass (inclusive of added mass) and stiffness. When an oscillating body adopts an axially symmetric configuration, it exhibits four distinct frequencies: surge (equivalent to sway), heave, pitch (equivalent to roll), and yaw. Yaw motion primarily arises from torque, a phenomenon less common in symmetrically shaped objects and thus not extensively addressed herein.

Upon attachment of a restraining system, the WEC's six natural frequencies may become distinct due to potential asymmetry in lateral stiffness. In this invention, the design approach does not aim to target a specific wave frequency. Rather, it seeks to distribute the natural frequencies of the WEC as widely as possible within the desired wave frequency range.

Figure 2:
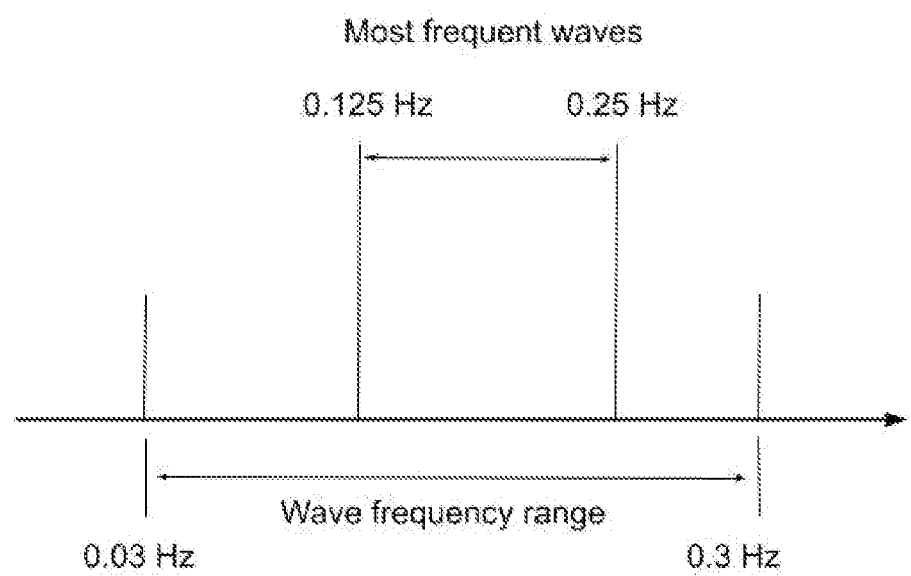
FIG. 2 illustrates the wave frequency range and the most prevalent wave frequencies.

Referring now to FIG. 2, which describes the wave frequency range, a method to align the natural frequency with the wave frequency is outlined below: (1) the natural frequencies of the WEC, likely those governing heave, roll, and pitch, are adjusted to align with those wave frequencies of 0.125 to 0.25 Hz (for the most prevalent waves), and (2) for wave frequencies falling outside this range (yet within 0.03 to 0.3 Hz), supplementary, smaller-sized mechanical resonators are affixed to the oscillating body. The operational principles of these devices will be elaborated upon in FIG. 12, along with accompanying text, subsequent to the comprehensive discussion of the entire WEC's operational principles.

Another approach to aligning the natural frequency of a WEC with the wave frequency involves adjusting the natural frequency by modifying either the system mass, stiffness, or both. In this particular invention, this can be achieved through altering (1) the mass of the oscillating body by adding or removing ballast weights, and (2) the added mass of the oscillating body using a foldable ring plate.

Referring now to FIG. 3A and FIG. 3B, two positions of the folding plate on the ballasted oscillating body (a circular cylinder in shape) are depicted: FIG. 3A illustrates the plate in the closed position, while FIG. 3B shows the plate in the open position. In FIG. 3A, the foldable plate 302, located at the lower end of the oscillating body 301 with removable ballast weights 304, can be opened via hinge 303 to expand the plane area, thereby increasing the added mass of the oscillating body 301, particularly in the heave, roll, and pitch directions. Note that in FIG. 3B, the hinge 303 depicted in FIG. 3A is predominantly concealed by the plate 302. For a circular cylinder, such as the one depicted, the heave added mass is directly proportional to the cylinder's radius cubed. Thus, if the radius is increased by 20%, the added mass could be 1.728 times greater, resulting in a reduction of the corresponding natural frequency. The total mass of the oscillating body can also be altered by adding or removing the ballast weights.

Referring now to the embodiment depicted in FIG. 1, the second primary component of the present invention, namely the oscillating body restraining system, comprises mooring lines and their seabed anchors. These lines adopt a catenary shape and are freely suspended from the oscillating body at the upper attachment point. As the oscillating body shifts position under the influence of oscillatory wave forces, the moorings move accordingly without undergoing any line stretch.

To fulfill its intended function, the mooring lines must possess adequate strength. Two discernible criteria must be met for the restraining system to function effectively: (1) during extreme events such as severe storms, the maximum load exerted on the mooring line must remain below the line's break load and the holding capacity of its anchor, and (2) the restoring force exerted by the moorings must exceed any resistive forces to enable the oscillating body to return to its designated position.

To accommodate environmental loads from various directions, a sufficient number of mooring lines must encircle the oscillating body in a 360-degree configuration. The minimum requirement is three mooring lines positioned at 120-degree intervals around the oscillating body.

Referring now to FIG. 4A and FIG. 4B, these illustrations depict different mooring configurations for the oscillating body. In FIG. 4A, oscillating body 401 is tethered by three mooring lines 402, while in FIG. 4B, it is secured by four mooring lines 402. If the extreme load exceeds expectations, additional mooring lines may be required. Furthermore, each line in FIG. 4A and FIG. 4B can be conceptualized as a group of two, three, or four lines. The central angle between two adjacent groups equals 360 degrees divided by the number of mooring line groups.

These mooring lines are anchored to the seafloor and may consist of chain links, synthetic ropes, steel wire ropes, or a combination thereof. Cost-effective and easily deployable drag anchors are commonly employed to secure the mooring lines to the seafloor, representing the prevailing mooring solution in the offshore industry. In regions with harsher environmental conditions, stronger mooring anchors like driven pile anchors can be employed. From a design and operational standpoint, there is no distinction between the moorings utilized in the present invention and those employed on deepwater floaters for ocean energy exploration and production.

The final primary component of the present invention is the linear generator-based PTO system. Referring to FIG. 1, the function of the PTO system, which comprises linear generators 105, is to convert the mechanical energy carried by oscillating body 101 into electricity.

The fundamental concept of a linear generator revolves around harnessing the relative linear movements between two components: the slider (or piston rod) and the stator (or cylinder barrel). The slider is outfitted with a series of coils, while the stator is equipped with permanent magnets, or vice versa. This configuration is commonly known as a permanent magnet linear generator. Its operation relies on Faraday's law of electromagnetic induction: a magnetic field can induce an electric current in a moving conductor. The electromotive force induced in a circuit is directly proportional to the rate of change of magnetic flux through the circuit. Thus, the faster the change in the magnetic field, the greater the induced electromotive force.

Consequently, as oscillating body 101 moves with the waves, it causes linear generators 105 to expand and contract, thereby converting the linear motion of mechanical energy into electrical energy. One of the key design principles for the lengths of these expandable and retractable linear generators is to ensure that there is still room for expansion at the maximum offset of the oscillating body and for contraction at the still water position. Adhering to this principle prevents the linear generators from experiencing structural forces that could potentially damage them. At the water surface, the orbit diameter of waves equals the wave height. Once the wave height is known, the maximum excursion of the oscillating body can be predicted.

Figure 5:
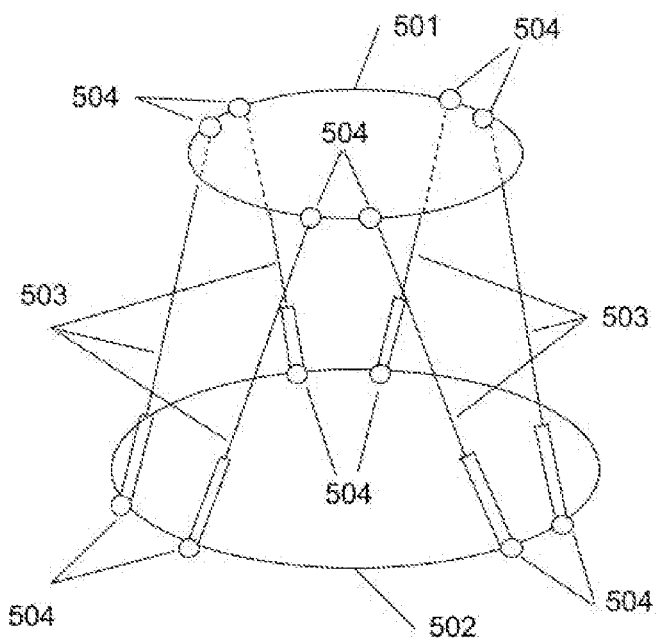
FIG. 5 presents a Stewart platform and its application within the present invention.

To efficiently harness the mechanical energy carried by the oscillating body, a method for attaching and operating the linear generators is essential. The operation of the PTO system in the present invention bears resemblance to that of a Stewart platform. Illustrated in FIG. 5, a Stewart platform comprises a top plate 501, a base plate 502, six prismatic actuators (typically hydraulic jacks or electric linear actuators) 503, and twelve universal joints 504. These actuators 503 are paired and attached to three positions on the baseplate 502, extending to three mounting positions on the top plate 501, with all connections facilitated by universal joints 504. Upon activation, the top plate 501 gains movement in six DOF: three linear movements—longitudinal, lateral, and vertical (or, in naval architecture terminology, surge, sway, and heave, respectively), and three rotations—roll, pitch, and yaw.

In the current invention as depicted in FIG. 1, the workflow undergoes inversion: the wave-activated oscillating body 101 (analogous to the top plate 501 in FIG. 5) serves as the driving force for the attached expandable and retractable linear generators 105 (comparable to actuators 503 in FIG. 5) affixed to the seabed template 109 (akin to the base plate 502 in FIG. 5), thereby generating electricity. Put differently, whereas a Stewart platform transforms electrical energy (or that contained within pressurized hydraulic fluids) into mechanical energy, the present innovation converts mechanical energy into electrical energy.

Figure 6:
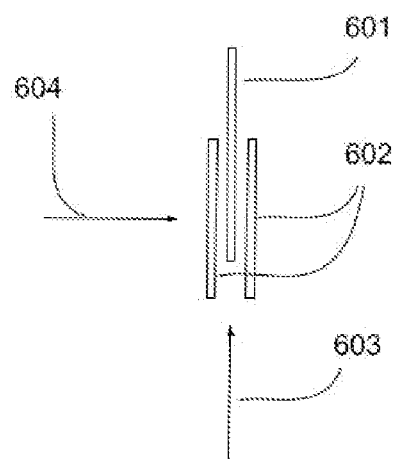
FIG. 6 illustrates the forces acting on a linear generator.

Referring now to FIG. 6, both the slider 601 and stator 602 of a linear generator are subjected to a variety of internal and external forces, including the electromotive force, the self-weight of the slider and stator, and environmental loads. These forces can manifest as an axial force (along the longitudinal direction) 603 and a lateral force (transverse to the longitudinal direction) 604. Among these, particular attention must be paid to the axial force 603 when it transitions into compression. Should this force exceed a certain threshold and the linear generator lacks sufficient structural integrity, buckling may occur. Depending on the specific design, both the slider and the stator can be conceptualized as structural columns. In this context, the Euler buckling formula becomes pertinent: $P_{cr}=\pi^2 EI/L^2$, where $P_{cr}$ is the critical buckling load, E is Young's modulus of the column material, I is the area moment of inertia, and L is the column length. When the compressive force acting upon the column is within the critical buckling load, structural buckling will not occur. Notably, the Euler formula reveals that the critical load diminishes significantly with increasing column length (height). Consequently, linear generators operating within deeper waters require reinforcement, as their greater length renders them more susceptible to axial weaknesses (as illustrated in FIG. 1).

Figure 7:
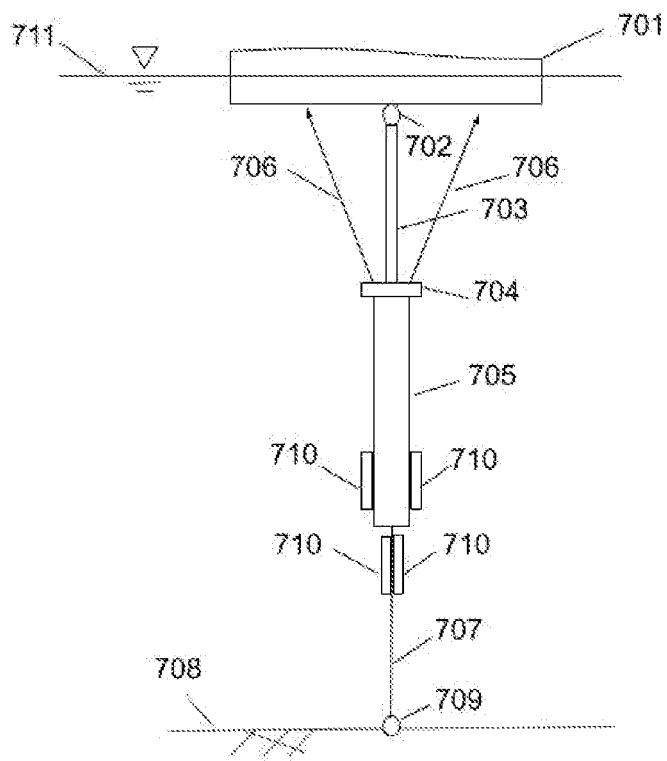
FIG. 7 demonstrates a tensioned linear generator (TLG).

One effective approach to bolstering buckling strength involves tensioning the stator, as depicted in FIG. 7, which illustrates a method commonly employed by the offshore industry to tension marine risers, such as drilling risers. The concept of a tensioned linear generator (TLG) is introduced herein: the TLG comprises a slider 703 and stator 705, affixed at its upper end via a universal joint 702 to an oscillating body 701 floating on the water surface 711. The lower end of the TLG connects to one end of a tether 707 which is secured at its other end by an anchor 709 on the seabed 708. Tensioners 706 are utilized to pull the load ring 704 atop the stator (cylinder barrel) 705. To mitigate the tension capacity requirement, buoyancy modules 710 can be installed on both the stator 705 and the tether 707.

As the oscillating body 701 moves with the waves, the TLG travels along, causing the slider 703 to expand or contract relative to the stator 705. In this manner, wave energy is converted into electricity. Regarding movement, the TLG operates similarly to the telescopic joint (also known as a slip joint) of a drilling riser, the latter of which has operated in water depths over 3,400 meters.

If the WEC with the in-water linear generators is deployed in shallow waters, such as up to approximately 30 meters in depth, the length of a linear generator is typically short enough to provide sufficient stability without risk of buckling. In such cases, the configuration depicted in FIG. 1 is suitable. Conversely, in deeper waters exceeding about 100 meters, the setup described in FIG. 7 becomes relevant. In this scenario, there would be six TLG, functioning structurally and mechanically in a similar manner to the actuators outlined in FIG. 5.

Figure 8:
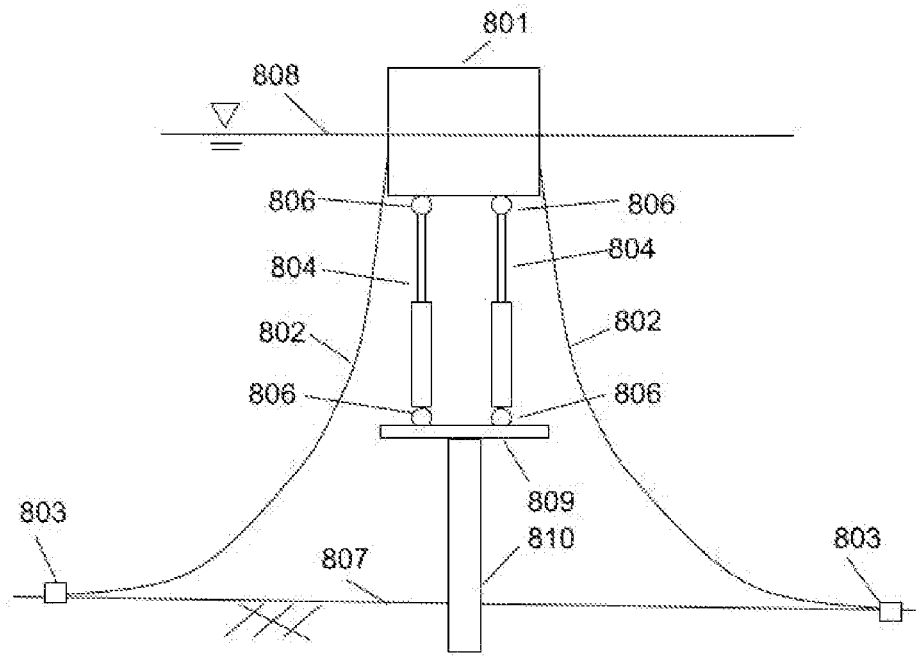
FIG. 8 exhibits a wave energy converter with linear generators mounted on a raised seabed template.

For water depths ranging between 30 and 100 meters, an intermediate solution is depicted in FIG. 8, where the seabed template shown in FIG. 1 is elevated to support the linear generators. The WEC in this scenario comprises: (1) an oscillating body 801 floating on the water surface 808, (2) a restraining system for oscillating body 801 comprising mooring lines 802 secured on the seabed 807 by anchors 803, and (3) a PTO system comprising expandable and retractable linear generators 804 connected via universal joints 806 to the oscillating body 801 at one end and, at the other end, to a raised seabed template 809 supported by a pile 810. The pile 810 is partially embedded in the seabed, providing stability similar to an earth-fixed structure.

Figure 9:
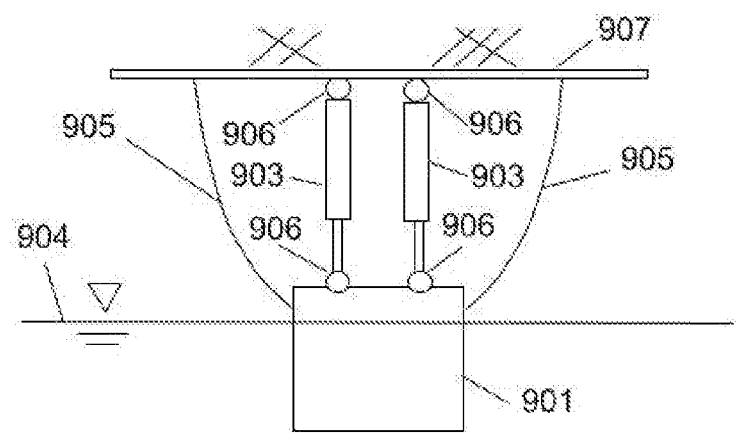
FIG. 9 displays a wave energy converter mounted beneath a platform deck.

The present invention also encompasses scenarios in which the linear generators and the restraining system are positioned outside of water, atop the oscillating body. In this arrangement, cables of the restraining system and the linear generators are secured beneath the deck of a fixed platform (a platform that remains largely immobile when subjected to environmental loads, such as a bottom mounted platform or a fully constrained platform). One such embodiment is illustrated in FIG. 9, featuring an oscillating body 901 floating on the water surface 904. The oscillating body 901 is tethered by cables 905 at one end, with the other end of the cables 905 attached to the deck 907. The cables 905 assume a catenary shape, influenced by its own weight, enabling the oscillating body 901 to move freely with the waves. A PTO system comprises expandable and retractable linear generators 903 connected via universal joints 906 to the oscillating body 901 at one end, and at the other end, to the deck 907 through universal joints 906. One advantage of this embodiment is that it allows for better control over the length of the linear generators, thereby minimizing the risk of buckling. It is also beneficial to position the linear generators outside of water.

Figures 10A, 10B:
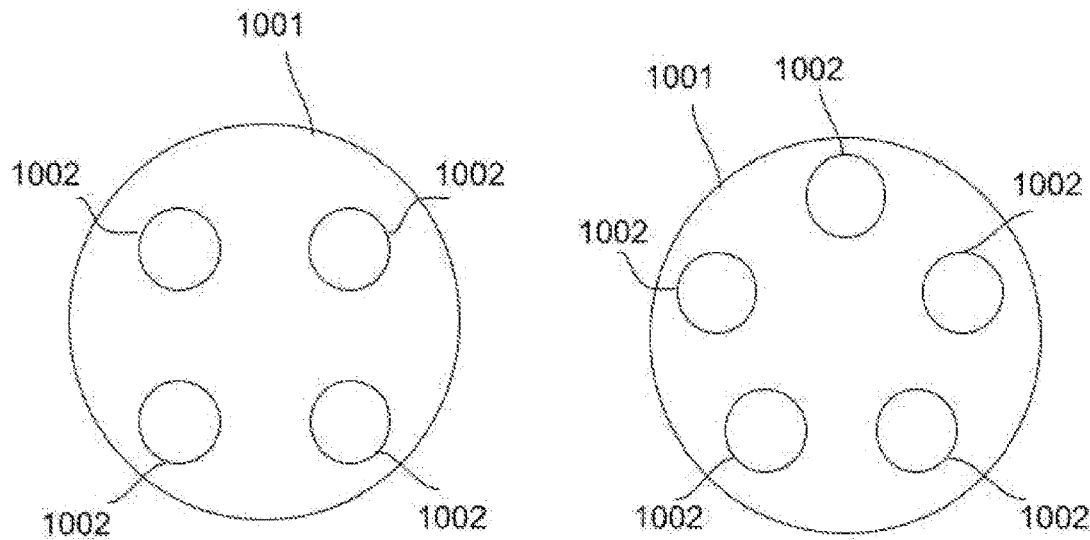
FIGS. 10A and 10B depict two platforms, each hosting several wave energy converters.

Multiple WEC, as depicted in FIG. 9, can be installed beneath a platform deck, as shown in FIG. 10A and FIG. 10B. FIG. 10A presents a plan view featuring four WEC 1002 mounted beneath the platform deck 1001, with each adjacent WEC separated by a central angle of 90 degrees (equal to 360 degrees divided by 4). In FIG. 10B, five WEC 1002 are mounted beneath the platform deck 1001, with each adjacent WEC separated by a central angle of 72 degrees (equal to 360 degrees divided by 5).

Figure 11:
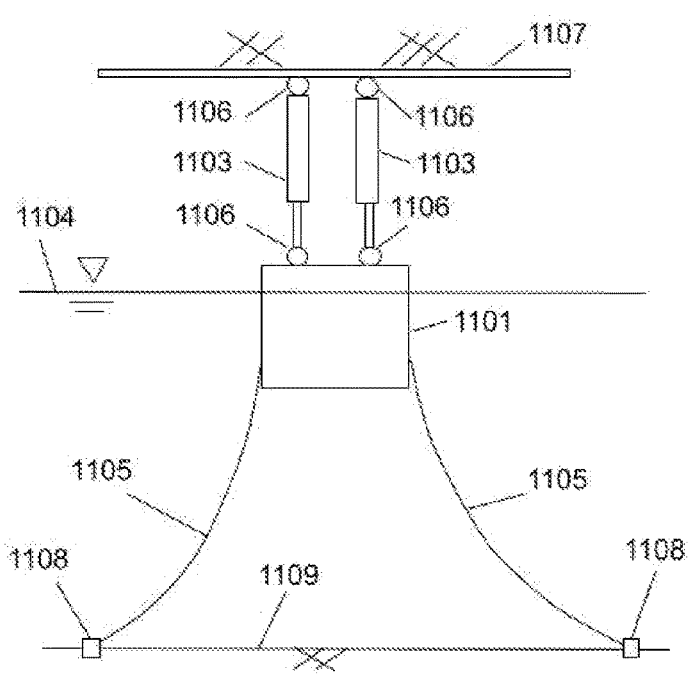
FIG. 11 depicts a wave energy converter featuring an oscillating body anchored to the seabed, with linear generators positioned beneath a platform deck.

Another scenario of the present invention involves positioning the linear generators above water, atop the oscillating body, while the restraining system remains within the water. One such embodiment is illustrated in FIG. 11, displaying an oscillating body 1101 floating on the water surface 1104. The oscillating body 1101 is tethered with moorings 1105, the opposite ends of which are secured by anchors 1108 on the seabed 1109. These moorings 1105 adopt a catenary shape, facilitating the oscillating body 1101 to move freely in response to waves. A PTO system comprises expandable and retractable linear generators 1103 connected via universal joints 1106 to the oscillating body 1101 at one end and to a platform deck 1107 through universal joints 1106 at the other end.

Figure 12:
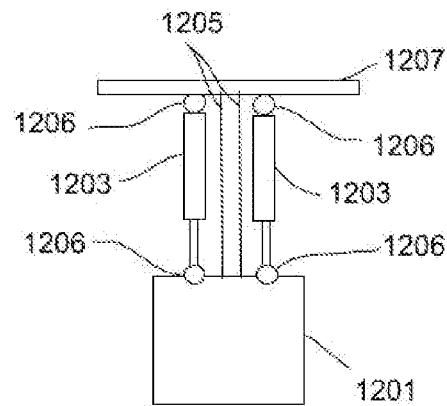
FIG. 12 illustrates an indirect wave energy converter (equivalent to mechanical resonator).

Referring now to FIG. 12, which outlines one embodiment of an indirect WEC—termed as such because these WEC are not directly exposed to waves. Indirect WEC shares many similarities with direct WEC, with one crucial distinction: they are activated by the motion of the oscillating body of a direct WEC. Illustrated in FIG. 12, the indirect WEC comprises an oscillating body 1201, linear generators 1203 along with universal joints 1206 for connections, and cables 1205. The oscillating body 1201 is linked by the expandable and retractable cables 1205, suspended beneath an upper base plate 1207. This upper base plate 1207 can be affixed to the oscillating body of a direct WEC. Essentially, an indirect WEC functions as a mechanical resonator, with its linear generators serving as dampers. As the oscillating body of the direct WEC oscillates, it induces vibrations in the indirect WEC (due to ground motion of base plate 1207). These vibrations of the oscillating body 1201 drive the linear generators 1203 to generate electricity. When the natural frequency of the indirect WEC closely aligns with a wave frequency, its oscillating body vibrates more intensely, resulting in greater extraction of wave energy.

Figure 13:
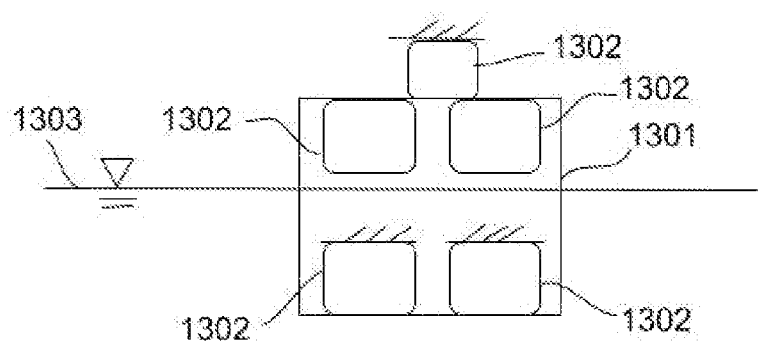
FIG. 13 provides a general arrangement of direct and indirect wave energy converters (WEC).

Turning to FIG. 13, indirect WEC 1302 are positioned both inside and outside the oscillating body of a direct WEC 1301 floating on the water surface 1303. Typically, there is one direct WEC and several associated indirect WEC. This configuration ensures more comprehensive coverage across the wave frequency spectrum, enabling efficient extraction of wave energy. It represents a wave energy conversion approach that leverages a combination of direct and indirect WEC.

Other features of the present invention include: (1) during severe storms, it's imperative to park the WEC in a non-production mode for safety. The PTO system can be disconnected from the oscillating body, safeguarding vital equipment and structures from potential damage caused by the storm's forces, (2) the Stewart platform usually incorporates 6 prismatic cylinders as actuators for the top plate. However, for a WEC, the number of linear generators could be reduced to 3 to reduce costs, provided the efficiency of the PTO system remains intact. This means ensuring minimal loss of power conversion compared to systems with 6 linear generators, and (3) the indirect WEC can be deployed on both shallow and deep-water ocean platforms to serve as dampers, mitigating the motions of these platforms while simultaneously converting wave energy into electricity. This setup enhances stability and harnesses wave energy for use by these platforms. FIG. 13 can also be conceptualized as such an application.

Consequently, with the present invention, the wave energy captured by the oscillating body's six-DOF motions can be efficiently converted into electricity by the PTO system comprising linear generators. By employing a combination of direct and indirect WEC, electricity generation at utility scale becomes feasible in both shallow and deep waters.

I claim:

1. A utility-scale wave energy converter in a body of water, comprising:
   an oscillating body floating on the water surface;
   a plurality of slender, flexible elements, each connected at a first end to said oscillating body and at a second end to a fixed object; and
   a plurality of slender, linear generators, each connected at one end to the oscillating body and at the other end to a fixed earth structure, with all connections made via universal joints, comprising a Stewart platform configuration.

2. The utility-scale wave energy converter of claim 1, wherein said oscillating body maintains a positive metacentric height and moves freely in waves in all six degrees of freedom.

3. The utility-scale wave energy converter of claim 1, wherein said oscillating body is adaptable with ballast weights and foldable plates.

4. The utility-scale wave energy converter of claim 1, wherein said oscillating body is configured in a substantially circular shape capable of omnidirectional interaction with waves, and is constructed from metallic and nonmetallic structural materials.

5. The utility-scale wave energy converter of claim 1, further comprising one or more mechanical resonators attached to said oscillating body- and designed to function as indirect wave energy converters in a Stewart platform configuration.

6. The utility-scale wave energy converter of claim 1, wherein said slender, flexible elements form a catenary shape, freely suspended from said oscillating body, extensible in response to changes in shape, and configured not to restrict the movement of said oscillating body in waves.

7. The utility-scale wave energy converter of claim 1, wherein said slender, flexible elements comprise chain links, synthetic ropes, steel wire ropes or combinations thereof.

8. The utility-scale wave energy converter as claimed in claim 1, wherein said fixed object to which the second end of said slender, flexible elements is connected comprises a seabed anchor or a deck of an ocean platform.

9. The utility-scale wave energy converter of claim 1, wherein the slender, flexible elements, with at least three, surround said oscillating body and spread out in a 360-degree range to accommodate environmental loads from various directions.

10. The utility-scale wave energy converter of claim 1, wherein the number of said linear generators ranges from three to six.

11. The utility-scale wave energy converter of claim 1, wherein said fixed earth structure, to which said other end of said linear generators is connected, comprises a seabed template or a raised seabed template.

12. The utility-scale wave energy converter of claim 1, wherein said fixed earth structure, to which said other end of said linear generators is connected, comprises a deck of an ocean platform.

13. The utility-scale wave energy converter of claim 1, wherein said fixed earth structure, to which said other end of said linear generators is connected, comprises a tether extending downward and linked to a seabed anchor.

14. The utility-scale wave energy converter of claim 1, wherein a cylinder barrel component of said linear generators is tensioned, wherein in some embodiments, the tensioning includes attached submerged buoyancy modules.

15. A method for inventing a utility-scale wave energy converter in a body of water, comprising:
  configuring the top, movable plate of a Stewart platform into an oscillating body floating on the water surface to respond to waves, and converting the actuators of the Stewart platform into linear generators to produce electricity, such that a traditionally actuator-driven system is reversed into a energy-harvesting system;
  designing the oscillating body to have a positive metacentric height, enabling free movement in all six degrees of freedom, and allowing for adaptability with ballast weights, foldable plates, and one or more mechanical resonators;
  developing a restraining system, comprising a plurality of slender, flexible elements, which secures said oscillating body to a fixed object, against displacement by steady environmental load and returns said oscillating body to pre-disturbed position; and
  creating multiple linear generators for power take-off, connecting the oscillating body to a fixed earth structure, with all connections made via universal joints, in a Stewart platform configuration.

16. The method of claim 15, wherein the natural frequency of said utility-scale wave energy converter is designed to align with wave frequency, comprising:
  synchronizing the natural frequency of said utility-scale wave energy converter to prevalent wave frequencies by adjusting the mass and added mass of the oscillating body; and
  integrating mechanical resonators into said oscillating body, with their natural frequencies targeting additional wave frequencies.

17. The method of claim 15, wherein said fixed object to which said oscillating body is secured by said restraining system is at least one of a seabed template or a deck of an ocean platform, and wherein said fixed earth structure to which said linear generators are connected is at least one of a seabed template, a raised seabed template, or a deck of an ocean platform.

18. The method of claim 15, wherein the required length of said linear generators is customized for both still water and maximum excursion positions of said oscillating body.

19. The method of claim 15, wherein the linear generators, when submerged in water, are designed for utilization in both shallow and deep water environments, by tensioning the cylinder barrels, attaching submerged buoyancy modules onto the cylinder barrels, and connecting the cylinder barrels to seabed-secured tethers or a raised seabed template.

20. A method for employing indirect wave energy converters as dampers on ocean platforms situated in shallow and deep waters, and utilizing the generated electricity for powering these platforms, comprising:
  structuring the indirect wave energy converters in a Stewart platform configuration;
  designing an oscillating body responding to ocean platforms' motion due to waves, capable of movement in all six degrees of freedom;
  developing a restraining system comprising a Plurality of expandable and retractable cables that secure the oscillating body to a base plate fixed on the ocean platforms, preventing excessive displacement and returning the oscillating body to pre-disturbed position; and
  creating multiple linear generators for power take-off, connecting the oscillating body to the base plate fixed on the ocean platforms, with all connections made via universal joints, in a Stewart platform configuration.

* * * * *